US012579038B2

(12) United States Patent
Agasar et al.

(10) Patent No.: US 12,579,038 B2
(45) Date of Patent: Mar. 17, 2026

(54) METHOD AND APPARATUS FOR BACKING UP GLOBAL MEMORY

(71) Applicant: Dell Products L.P., Round Rock, TX (US)

(72) Inventors: Mahadev Agasar, Rabkavi (IN); Pavitra H Gadagi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 18/645,999

(22) Filed: Apr. 25, 2024

(65) Prior Publication Data

US 2025/0335301 A1      Oct. 30, 2025

(51) Int. Cl.
| | |
|---|---|
| *G06F 11/00* | (2006.01) |
| *G06F 11/07* | (2006.01) |
| *G06F 11/14* | (2006.01) |
| *G06F 11/1446* | (2026.01) |

(52) U.S. Cl.
CPC ...... *G06F 11/1428* (2013.01); *G06F 11/0772* (2013.01); *G06F 11/1456* (2013.01)

(58) Field of Classification Search
CPC ............. G06F 11/1428; G06F 11/0772; G06F 11/1456
See application file for complete search history.

(56) References Cited

U.S. PATENT DOCUMENTS

| | | | | |
|---|---|---|---|---|
| 7,203,861 | B1 * | 4/2007 | Asano ................. | G06F 11/1464 711/112 |
| 8,341,121 | B1 * | 12/2012 | Claudatos ........... | G06F 11/1451 707/694 |
| 9,798,629 | B1 * | 10/2017 | Shilane ............... | G06F 11/1466 |
| 2005/0257085 | A1 * | 11/2005 | Haustein ............. | G06F 11/1461 714/13 |
| 2006/0218439 | A1 * | 9/2006 | Carter-Schwendler ...................... G06F 21/56 714/E11.124 |
| 2016/0246686 | A1 * | 8/2016 | Sakata ................. | G06F 11/1456 |
| 2017/0277587 | A1 * | 9/2017 | Matsuzawa ......... | G06F 11/0778 |
| 2018/0373429 | A1 * | 12/2018 | Yamamoto .............. | G06F 3/061 |
| 2019/0004908 | A1 * | 1/2019 | Gopinath ........... | G06F 11/1451 |
| 2019/0129812 | A1 * | 5/2019 | Subrahmanyam .. | G06F 11/1438 |
| 2019/0205235 | A1 * | 7/2019 | Kishore .............. | G06Q 10/063 |
| 2021/0034482 | A1 * | 2/2021 | Deguchi ............. | G06F 11/2069 |

* cited by examiner

*Primary Examiner* — Philip Guyton
(74) *Attorney, Agent, or Firm* — Daly, Crowley, Mofford & Durkee, LLP

(57)      ABSTRACT
A method, comprising: detecting an event indicating a hardware malfunction in one of a plurality of storage processors in a storage system; initiating a vault copy operation in response to the event, the vault copy operation being an operation in which a global memory of the storage system is copied to a non-volatile memory, the global memory including a plurality of portions that share a same address space, each portion being implemented by using physical memory hardware of a different one of the plurality of storage processors; detecting whether the vault copy operation is completed successfully; and when the vault copy operation is not completed successfully, generating a service ticket for servicing a hardware component that is identified in the event as having malfunctioned.

17 Claims, 7 Drawing Sheets

<u>400</u>

402

RETRIEVE THE CONTENTS OF A VAULT HISTORY LOG

404

DISPLAY THE RETRIEVED CONTENTS IN A VAULT HISTORY WINDOW

406

RETRIEVE A PLURALITY OF SERVICE TICKETS FROM A SERVICE TICKET DATABASE

408

DISPLAY THE RETRIEVED SERVICE TICKETS IN A SERVICE TICKET WINDOW

600

METHOD AND APPARATUS FOR BACKING UP GLOBAL MEMORY

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: detecting an event indicating a hardware malfunction in one of a plurality of storage processors in a storage system; initiating a vault copy operation in response to the event, the vault copy operation being an operation in which a global memory of the storage system is copied to a non-volatile memory, the global memory including a plurality of portions that share a same address space, each portion being implemented by using physical memory hardware of a different one of the plurality of storage processors; detecting whether the vault copy operation is completed successfully; and when the vault copy operation is not completed successfully, generating a service ticket for servicing a hardware component that is identified in the event as having malfunctioned.

According to aspects of the disclosure, a system is provided, comprising: a memory; and at least one processor that is operatively coupled to the memory, the at least one processor being configured to perform the operations of: detecting an event indicating a hardware malfunction in one of a plurality of storage processors in a storage system; initiating a vault copy operation in response to the event, the vault copy operation being an operation in which a global memory of the storage system is copied to a non-volatile memory, the global memory including a plurality of portions that share a same address space, each portion being implemented by using physical memory hardware of a different one of the plurality of storage processors; detecting whether the vault copy operation is completed successfully; and when the vault copy operation is not completed successfully, generating a service ticket for servicing a hardware component that is identified in the event as having malfunctioned and storing the service ticket in a task maintenance database.

According to aspects of the disclosure, a non-transitory computer readable medium is provided that stores one or more processor-executable instructions, which, when executed by at least one processor, cause the at least one processor to perform the operations of: detecting an event indicating a hardware malfunction in one of a plurality of storage processors in a storage system; initiating a vault copy operation in response to the event, the vault copy operation being an operation in which a global memory of the storage system is copied to a non-volatile memory, the global memory including a plurality of portions that share a same address space, each portion being implemented by using physical memory hardware of a different one of the plurality of storage processors; detecting whether the vault copy operation is completed successfully; and when the vault copy operation was not completed successfully, generating a service ticket for servicing a hardware component that is identified in the event as having malfunctioned and storing the service ticket in a task maintenance database.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
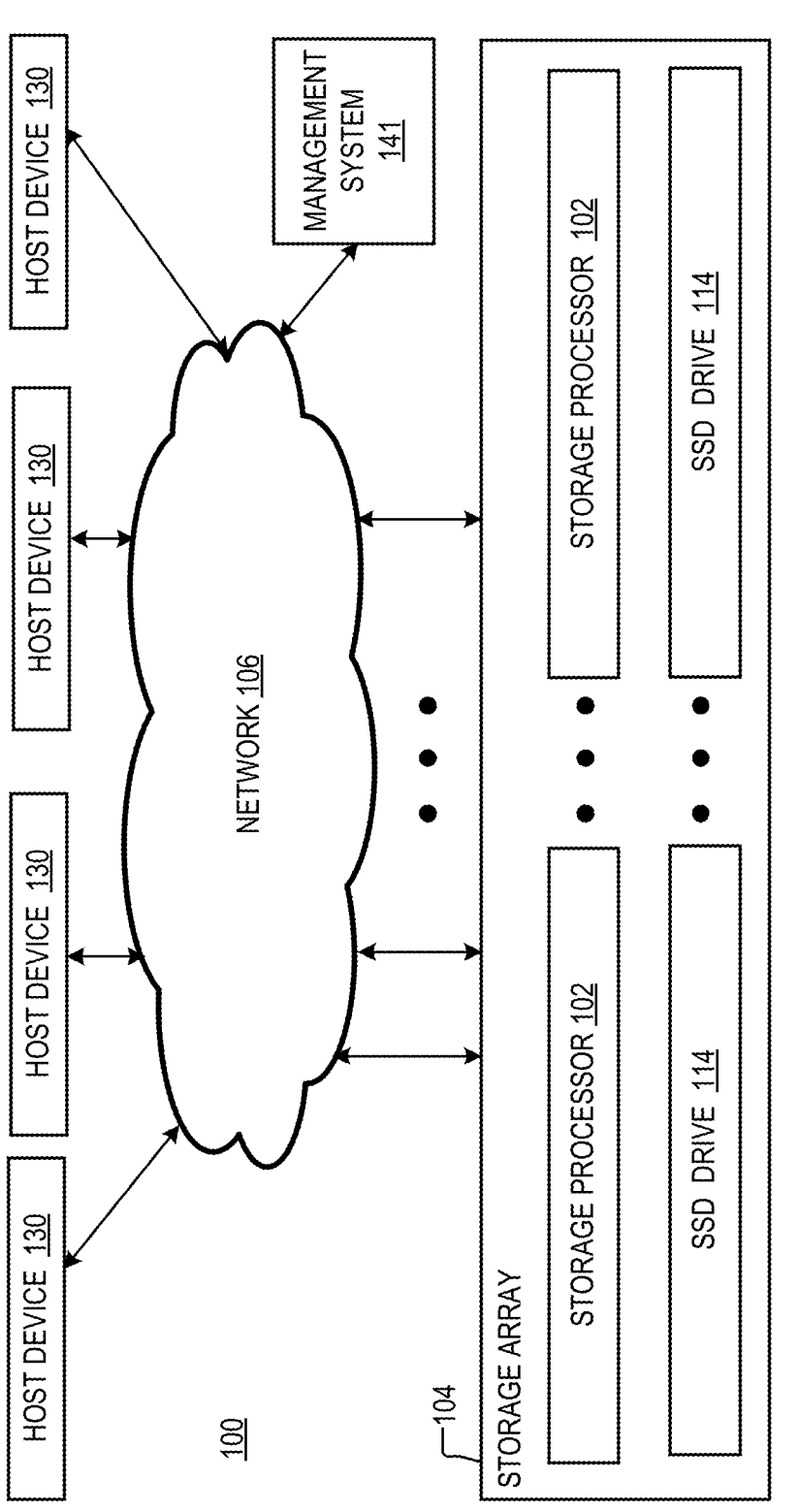
FIG. 1A is a diagram of an example of a system, according to aspects of the disclosure.

In the storage world, performing adequate backup is the key to ensuring that a storage system is up and running without any data loss or unavailability. Hardware and software failures can occur at any time in a storage system, putting the storage system at risk of data loss or unavailability. When such failures occur, having a proper backup is essential to ensuring that the storage system will be able to return to an operational state without any data loss and with minimal unavailability.

Vault backup is one type of backup in a storage system. The vault backup involves making a copy of the global memory of the storage system, which can be subsequently used to bring back the system to the state it was in before. The global memory of a storage system is a distributed memory that is spread over many storage processors in the storage system, and which is used to cache pending writes and/or store other information.

The task of making a copy of the global memory of a storage system is herein referred to as a "vault copy operation". According to the present disclosure, it has been determined that a vault copy operation may be triggered by various hardware failures in the storage system. However, triggering a vault copy operation is not sufficient to ensure the creation of a backup of the global memory. Due to the inherent complexities of the global memory and the complexities of the vault copy operation itself, there is no guarantee that an initiated vault copy operation will be completed successfully.

At present, many conventional storage systems lack the facilities to follow through on initiated vault copy operations to ensure that they are completed successfully. In this regard, the present disclosure provides a vault manager that is arranged to monitor vault copy operations that are started and ensure that the vault copy operations are completed successfully. Moreover, the vault manager may perform additional tasks such as generating service tickets that address the issues that caused the vault copy operations to be executed in the first place and updating a vault history log to increase awareness among system administrators of the vault copy operations that are being performed in the storage system.

Integrating the vault manager into a storage system may yield numerous advantages. For example, the vault manager may help avoid system downtime, incorrect system behavior, or data loss. Specifically, the vault manager may help avoid potential system state inconsistency, data corruption, or the need to perform recovery of corrupted data. As another example, the vault manager may also help reduce data unavailability due to a failure of a vault copy operation to execute. As yet another example, the vault manager may maintain a historical record of vault copy operations that are initiated by the vault manager. As yet another example, the vault manager may help increase awareness among system administrators of what information was not successfully backed up.

FIG. 1A is a diagram of an example of a system 100, according to aspects of the disclosure. As illustrated, the system 100 may include a storage array 104, a communications network 106, a plurality of host devices 130, and a management system 141. The communications network 106 may include one or more of a fibre channel (FC) network, the Internet, a local area network (LAN), a wide area network (WAN), and/or any other suitable type of network. The storage array 104 may include a storage system, such as DELL/EMC Powermax™, DELL PowerStore™, and/or any other suitable type of storage system. The storage array 104 may include a plurality of storage devices 114 and a plurality of storage processors 102. Each of the storage processors 102 may include a computing device, such as the computing device 600, which is discussed further below with respect to FIG. 6. Each of the storage processors 102 may be configured to receive I/O requests from host devices 130 and execute the received I/O requests by reading and/or writing data to storage devices 114. Each of the host devices 130 may include a desktop computer, a laptop, a smartphone, an internet-of-things (IoT) device, and/or any other suitable type of computing device. According to the present example, each of storage devices 114 is a solid-state drive (SSD). However, alternative implementations are possible in which any of storage devices 114 is a different type of storage device, such as a hard disk or a non-volatile random-access memory (NVRAM) device.

Figure 1B:
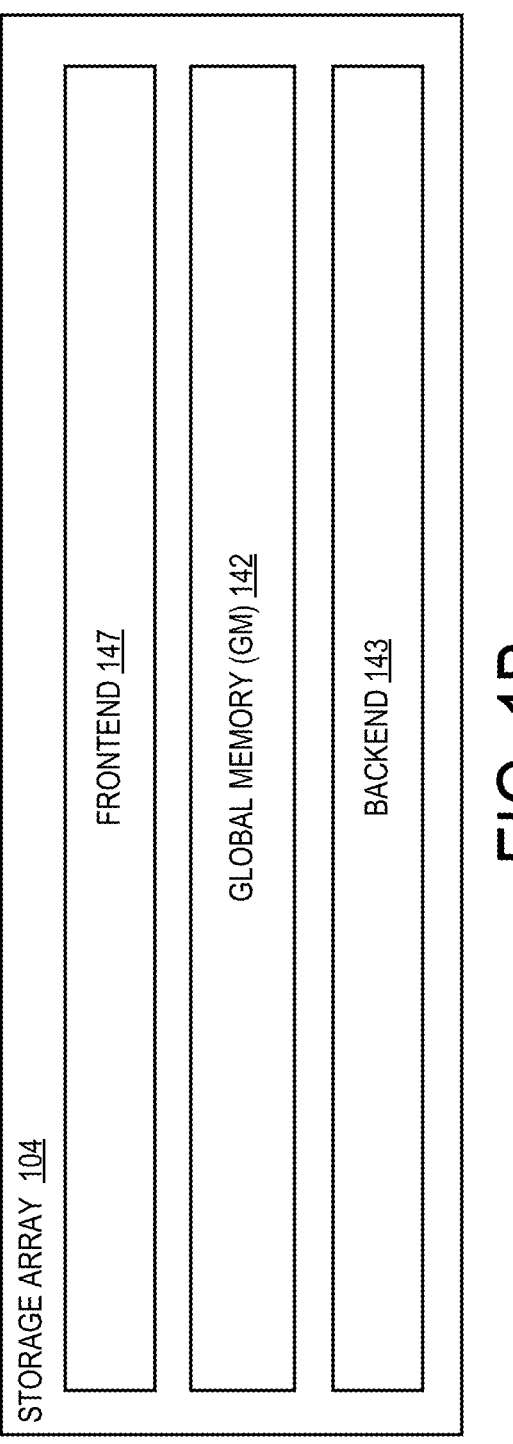
FIG. 1B is a diagram illustrating aspects of the operation of a storage array, according to aspects of the disclosure.

FIG. 1B is a diagram illustrating aspects of the operation of storage array 104, according to aspects of the disclosure. FIG. 1B illustrates that storage processors 102 may together implement a frontend 147, a backend 143, and a global memory (GM) 142. GM 142 includes a memory space that is shared among the storage processors in storage array 104, and which is used for the caching of data. GM 142 may be formed by pooling into the same address space some of the memories of storage processors 102. GM 142 may include a plurality of portions. Each of the plurality of portions may be hosted (or implemented with) a different set of one or more dual input memory modules (DIMMs). Each set of DIMMs may be part of a different one of the storage processors 102. Optionally, when the storage devices 114 are SSDs, parts of GM 142 may be hosted in the respective persistent memory regions (PMRs) of storage devices 114 and/or the controller memory buffers (CMBs) of the storage devices 114. Stated succinctly, each of storage processors 102 may dedicate some of its available memory for use as part of GM 142 while retaining the rest of its available memory for use as local memory.

Each of the frontend 147 and backend 143 may be implemented as one or more processes that are executed on the storage processors 102. The frontend 147 may be responsible for caching in GM 142 data associated with incoming write requests and the backend 143 may be responsible for destaging the data from GM 142 into the storage devices 114. In addition, the backend 143 may be responsible for loading, into the GM 142, data associated with incoming read requests, and the frontend 147 may be responsible for returning the cached data to the senders of the read requests. The frontend 147 and backend 143 may be implemented as various services (or kernel components) of the storage processors 102.

Returning to FIG. 1A, management system 141 may include a computing device that is configured to perform a backup of GM 142. The operation of creating a backup of GM 142 is herein referred to as a "vault copy operation" and it is used to bring back storage array 104 to its prior stable state in the event of a failure in one of the storage processors 102. In the present example, performing a vault copy operation of GM 142 results in a copy of GM 142 being stored in storage devices 114. However, alternative implementations are possible in which the copy of GM 142 is stored in other non-volatile memory or storage devices. It will be understood that the present disclosure is not limited to any specific method for performing a vault copy operation.

Figure 2:
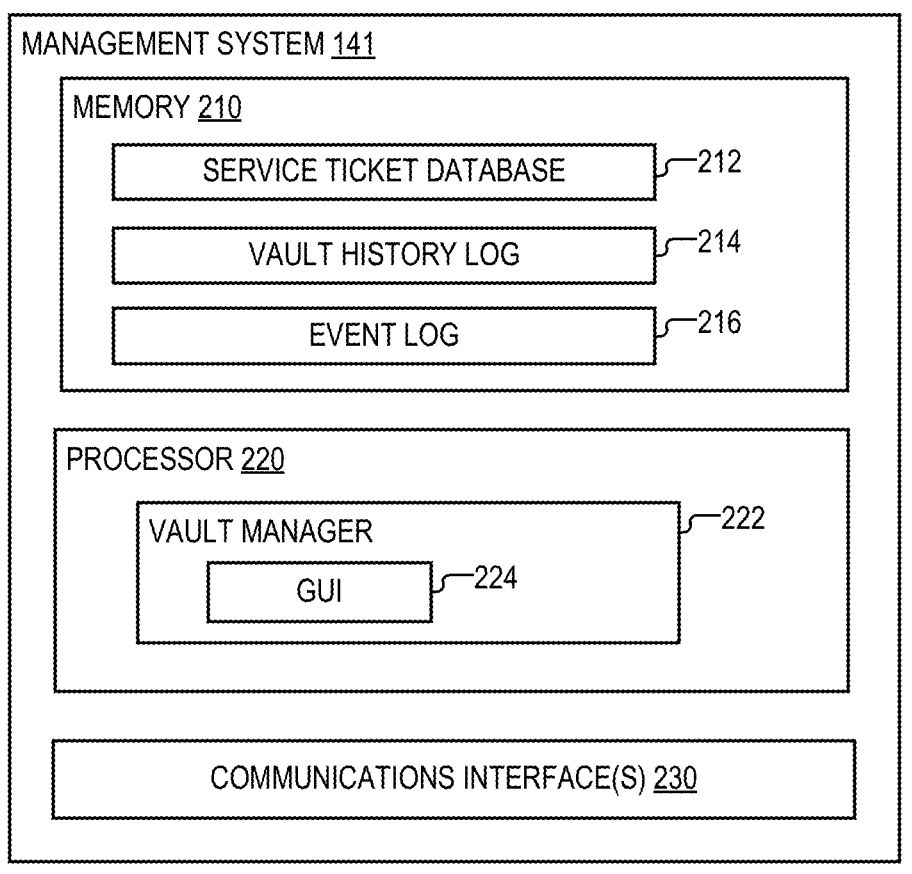
FIG. 2 is a diagram of an example of a management system, according to aspects of the disclosure.

FIG. 2 is a diagram of an example of the management system 141, according to aspects of the disclosure. As illustrated, the management system 141 may include a memory 210, a processor 220, and a communications interface 230. The memory 210 may include one or more of random-access memory (RAM), dynamic random memory (DRAM), flash memory, a hard drive (HD), a solid-state drive (SSD), a network-accessible storage (NAS), and or any other suitable type of memory device. The communications interface 230 may include any suitable type of communications interface, such as one or more Ethernet adapters, one or more Wi-Fi adapters (e.g., 802.1414 adapters), and one or more Long-Term Evolution (LTE) adapters, for example. The processor 220 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The communications interface 230 may include any suitable type of communications interface, such as one or more Ethernet adapters, one or more InfiniBand adapters, one or more Fibre Channel adapters, one or more Wi-Fi adapters (e.g., 802.1414 adapters), and one or more Long-Term Evolution (LTE) adapters, for example.

The memory 210 may be configured to store a service ticket database 212, a vault history log 214, and an event log.

The vault history log 214 may identify vault copy operations that have been attempted and/or completed by management system 141. The vault history log may include a plurality of entries. Each entry may correspond to a different vault copy operation that has been initiated and/or completed by vault manager 222. Each entry may include the time when its corresponding vault copy operation is initiated, and/or any other suitable type of information. For example, any of the entries in the vault history log 214 may identify one or more of: (i) the time when its corresponding vault copy operation was attempted, (ii) whether the vault copy operation was completed successfully, (iii) the event that triggered the execution of the vault copy operation, (iv) and whether the vault copy operation needed to be re-initiated before executing successfully (e.g., see steps 512 and 513 of process 500). In some implementations, an entry in the vault history log 214 may include an event identifier corresponding to the event that triggered the execution (or attempt) of the entry's corresponding vault copy operation. In one example, the identifier may indicate the type of the event. Examples of event types include "power supply failure", "AC loss", "high/irregular system temperature", "battery discharge error", "slow/offline fans", "fabric/ethernet errors", or "missing/faulty cable". Alternatively, the identifier may be unique to the event that triggered the execution of the entry's corresponding vault copy operation. In the latter case, the identifier may uniquely identify the event among all events of the same type (i.e., the identifier may be an event ID that is assigned when the ID is generated).

Additionally or alternatively, in some implementations, each entry (or at least some of the entries) in the vault history log 214 may be generated as a result of executing the process 500, which is discussed further below with respect to FIG. 5. Additionally or alternatively, any of the entries in the vault history log may include an identifier of a service ticket (include an identifier of a service ticket that was generated in response to the entry's corresponding vault copy operation having failed or being halted (e.g., see step 518 of process 500).

The event log 216 may be a log of events that are generated by the storage processors 102. The event may signal a failure of hardware components of different storage processors 102. Examples of the types of events that can be identified in the event log 216 include "power supply failure", "AC loss", "high/irregular system temperature", "battery discharge error", "slow/offline fans", "fabric/ethernet errors", or "missing/faulty cable.

The service ticket database 212 may include a plurality of service tickets. Each service ticket may include one or more of a number, a string, an object, a file, and/or any other suitable entity. Each service ticket may identify one of the storage processors and/or a hardware component of the storage processor that needs to be replaced or otherwise troubleshot. The service ticket database 212 may or may not be used for scheduling the activities of maintenance personnel tasked with maintaining the storage array 104. Each of the service tickets in the service ticket database may represent a different service call (or service task) that is to be performed by the service personnel. Examples of the types of actions (or tasks) that are identified in the service tickets that are stored in the service ticket database 212 include "replace power supply cables", "perform service to control temperature", "perform service to maintain battery health", "perform a service of cooling fans", "replace host bus adapter", "replace "ports", etc."

As used throughout the disclosure, the term "service" ticket shall mean "notification that requires the attention of personnel tasked with managing storage array 104." The personnel may include an on-site maintenance technician who is capable of replacing components and otherwise repairing physical damage or a system administrator who can change various configuration settings of storage array 104 and its storage processors by using a remote terminal. Although, in the present example, all service events are stored in the same database, it will be understood that different types of service events can be stored in different databases. Furthermore, it will be understood that different types of service tickets may be transmitted to different recipients.

Processor 220 may be configured to generate a vault manager 222. Vault manager 222 is implemented in software in the present example. However, alternative implementations are possible in which vault manager 222 is implemented in hardware or as a combination of software and hardware. Vault manager 222 may have a graphical user interface (GUI) 224. An example of one possible implementation of GUI 224 is discussed further below with respect to FIG. 3. In some implementations, vault manager 222 may be configured to execute processes 400 and 500, which are discussed further below with respect to FIGS. 4 and 5, respectively.

Figure 3:
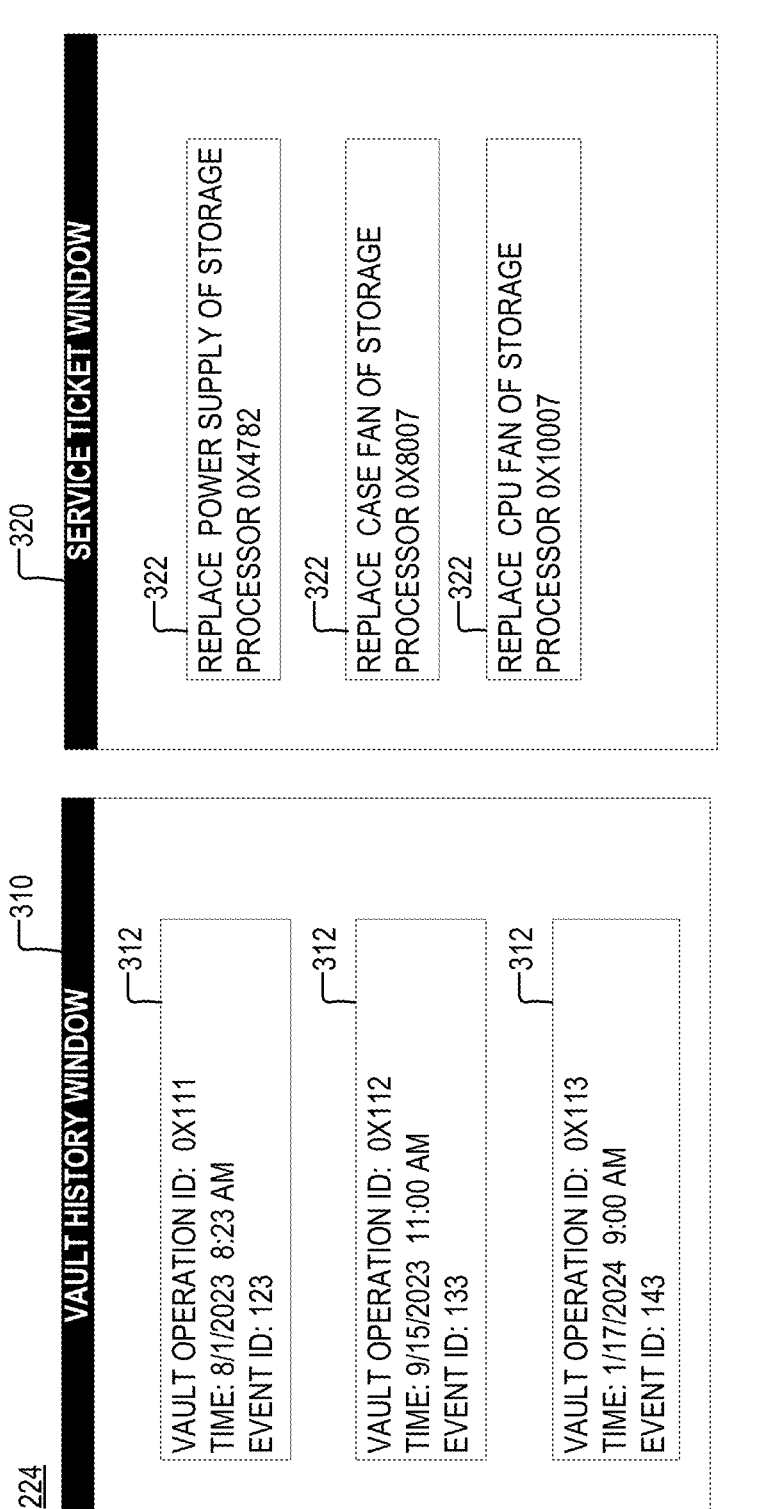
FIG. 3 is a diagram of an example of a graphical user interface (GUI), according to aspects of the disclosure.

FIG. 3 is a diagram of an example of the GUI 224, according to one implementation. In the example of FIG. 3, GUI 224 includes windows 310 and 320. Windows 310 and 320 may be displayed on a display device of management system 131. Window 310 is configured to show the contents of the vault history log 214. Window 310 may include a plurality of visual elements 312. Each visual element 312 may display the contents of a different one of the entries in the vault history log 214. Each visual element 312 may include a text label, a plurality of text labels, and or any suitable type of GUI components. In some implementations, window 310 may be used by system administrators to review the vault copy operations that have been attempted (and/or executed) in the past by management system 141.

Window 320 may include a plurality of visual elements 322. Each of the visual elements 322 may display the contents of a different one of the service tickets in the service ticket database 212. Each visual element 322 may include a text label, a plurality of text labels, and or any suitable type of GUI components. In some implementations, window 320 may be used by system administrators to keep track of the service tickets pending.

Figure 4:
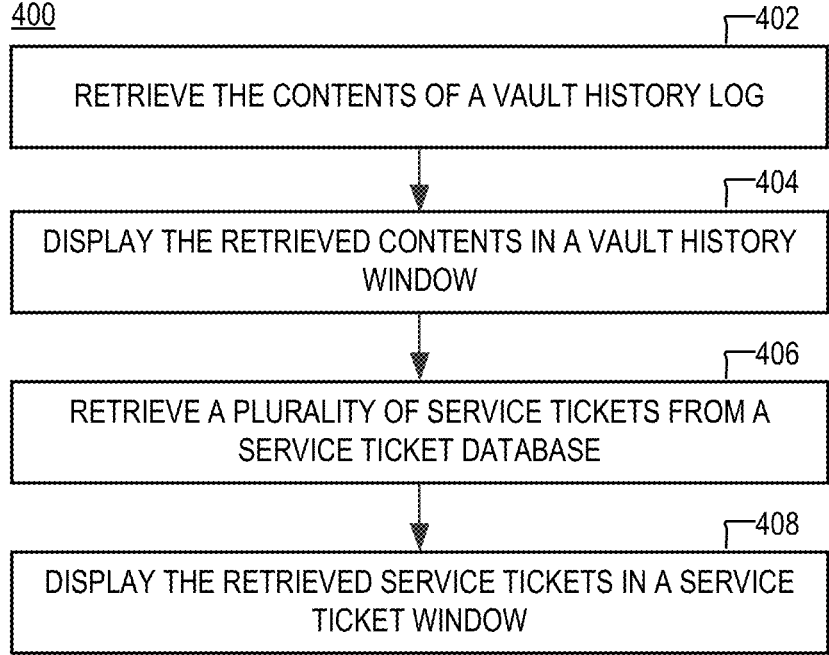
FIG. 4 is a flowchart of an example of a process, according to aspects of the disclosure.

FIG. 4 is a flowchart of an example of a process 400, according to aspects of the disclosure. According to the present example, process 400 is performed by vault manager 222. However, the present disclosure is not limited to any specific entity or set of entities executing the process 400.

At step 402, vault manager 222 retrieves at least some of the contents of the vault history log 214. According to the present example, vault manager 222 receives some or all of the entries that are stored in the vault history log 214. Each of the entries may correspond to a different vault copy operation that has been initiated by vault manager 222. The vault copy operation that is associated with each of the entries may or may not have been completed successfully.

At step 404, vault manager 222 displays the retrieved contents (at step 402) on a display device of the management system 141. According to the present example, the retrieved contents are displayed in window 310 (shown in FIG. 3). Each of the retrieved entries is displayed in a different visual element 312 of window 310.

At step 406, vault manager 222 retrieves a plurality of service tickets from the service ticket database 212. In one example, the vault manager 222 may retrieve all service tickets that were stored in the service ticket database 212 during a given time window (e.g., in the last 6 months). Additionally or alternatively, vault manager 222 may retrieve only service tickets that have not been resolved yet. Additionally or alternatively, vault manager 222 may retrieve both resolved and unresolved service tickets. Stated succinctly, the present disclosure is not limited to any specific type of content being retrieved from the service ticket database 212.

At step 408, vault manager 222 displays the contents retrieved in step 406 on the display device of management system 141. According to the present example, the retrieved contents are displayed in window 320 (shown in FIG. 2). Each of the retrieved service tickets may be displayed in a different visual element 322 of window 320.

Figure 5:
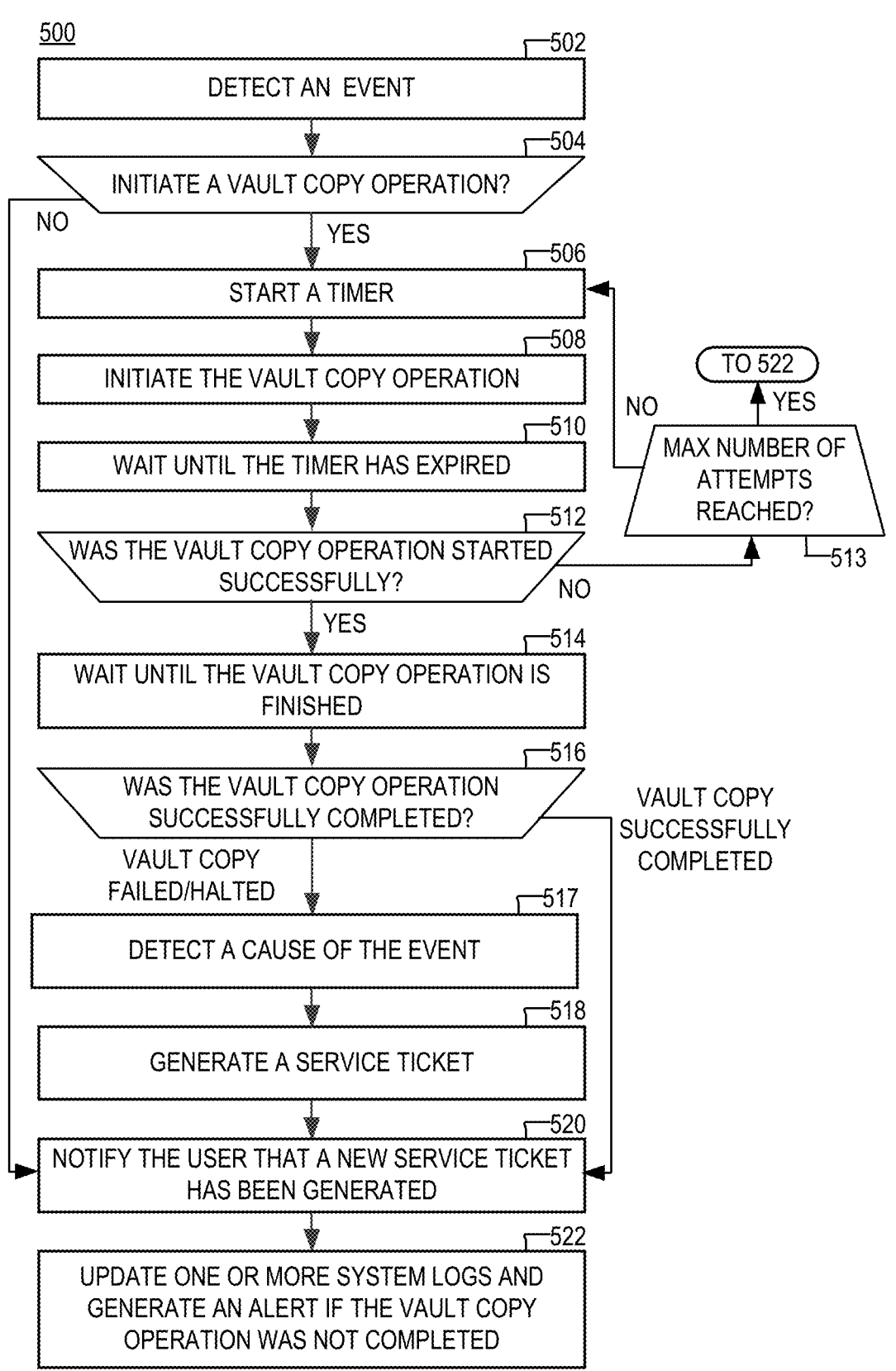
FIG. 5 is a flowchart of an example of a process, according to aspects of the disclosure.

FIG. 5 is a flowchart of an example of a process 500, according to aspects of the disclosure. According to the present example, process 500 is performed by vault manager 222. However, the present disclosure is not limited to any specific entity or set of entities executing the process 500.

At step 502, an event is detected by the vault manager 222. The event may be generated in any of the storage processors 102. The event may include a respective event descriptor that provides information regarding the event. The event descriptor may include an identifier of the storage processor 102 where the event was generated. Additionally or alternatively, the event descriptor may provide an error code (or other code) that identifies the type of the event or the type of failure that triggered the event. Additionally or alternatively, the event descriptor may include an identification of a particular hardware component of the storage processor 102 that has experienced a malfunction, wherein the malfunction is what caused the event to be generated. It will be understood that the event detected at step 502 may include any suitable type of event that is generated in storage array 104.

At step 504, vault manager 222 determines whether to initiate a vault copy operation. In general, some events may warrant the execution of a vault copy operation while others may not. In this regard, at step 504, vault manager 222 determines if the event detected at step 502 is one of those events that require the execution of a vault copy operation. If vault manager 222 determines that a vault copy operation needs to be performed, process 500 proceeds to step 506. Otherwise, process 500 proceeds to step 522.

In one example, storage array 104 may be configured such that at least some of the events that are generated by storage processors 102 include a need to vault (NTV) flag. For example, the descriptor of the events that are associated with a hardware malfunction may be provided with an NTV flag. In this regard, in some implementations, at step 504, vault manager 222 may detect whether the event (detected at step 502) includes an NTV flag. Next, if the event includes the NTV flag, vault manager 222 may determine the value of the flag. If the flag has a first value (e.g., '1'), vault manager 222 may determine that a vault copy operation is required to be performed. If the flag has a second value (e.g., '0'), vault manager 222 may determine that a vault copy operation is not required. As used throughout the disclosure, the term "malfunction" may refer to an error, a non-catastrophic failure, or a catastrophic failure.

In another example, the management system 141 may use a database to determine whether an event warrants the execution of a vault copy operation. The database may be stored in the memory of management system 141 or elsewhere. The database may include a plurality of entries. Each entry may contain an identifier of a different type of event along with an indication of whether the event warrants the execution of a vault copy operation. It will be understood that the present disclosure is not limited to any specific method for determining whether an event warrants the execution of a vault copy operation.

At step 506, vault manager 222 starts a timer. At step 510, vault manager 222 waits until the timer (started at step 508) has expired.

At step 508, vault manager 222 initiates a vault copy operation. The vault copy operation may be executed by a process (or set of processes) that is executed in management system 141 (or elsewhere). The process or set of processes may be independent of the vault manager 222. The vault copy operation may be initiated by placing an application programming interface (API) call to the process or set of processes. Placing the API copy may trigger a string of copy operations, where each copy operation involves the copying of a portion of the memory of a respective one of storage processor 102 that is dedicated to hosting GM 142. Because GM 142 is a distributed memory, it may be spread over a large number of storage processors and be subject to complex synchronization schemes. In this regard, executing the vault copy operation may be somewhat time-consuming (in comparison to tasks that can be completed near-instantaneously by storage array 104).

At step 512, vault manager 222 determines if the vault operation (initiated has started successfully). According to the present example, the vault copy operation is considered to have been started successfully if the vault copy operation is still pending at the time step 512 is executed—i.e., if the vault copy operation has not failed or otherwise terminated. If the vault copy operation was started successfully, process 500 proceeds to step 514. Otherwise, if the vault copy operation was not started successfully, process 500 proceeds to step 513.

At step 513, vault manager 222 may determine of a maximum number of attempts to execute the vault copy operation is reached. If the maximum number of attempts is reached, process 500 proceeds to step 522. Otherwise, process 500 returns to step 506, and the vault copy operation is imitated again.

In some respect, the ability to execute a vault copy operation at a given time instant may depend on the state of the storage array 104 (and/or GM 142) at that time instant. For example, if storage array 104 is in a first state when a vault copy operation is initiated (e.g., by placing one or more API calls), the vault copy operation may be started successfully. On the other hand, if the storage array 104 (or GM 142) is in a second state, placing the API calls may yield an error right away and the vault copy operation may not move forward at all. For example, the first state may be a state in which all locks on GM 142 are released and the second state may be a state in which one or more locks on portions of GM 142 are still active. In this regard, steps 508-513 address the peculiarity of storage array 104 (and/or GM 142) whereby the successful start of a vault copy operation may depend on the current state of storage array 104 and/or GM 142 at the time the vault copy operation is initiated.

In some implementations, the timer (started at step 508) may be set to a duration that is much shorter than the duration in which the vault copy operation would be expected to complete (e.g., 10 times shorter, etc.). Setting the timer to such a value is advantageous because it allows vault manager 222 to react by re-initiating the vault copy operation in due time before it is too late to respond to the event detected at step 502. In some implementations, vault manager 222 may detect whether the vault copy operation was started successfully by examining one or more error logs that would be updated (with error information) when the one or more processes that are responsible for executing the vault copy operation could not be launched and/or terminated the vault copy operation right at the onset (or shortly thereafter).

At step 514, vault manager 222 waits until the vault copy operation (initiated at step 502) is completed. In one example, vault manager 222 may wait until a predetermined event or interrupt is generated that is associated with the vault copy operation.

At step 516, vault manager 222 determines if the vault copy operation was completed successfully. In some implementations, the completion status of the vault copy operation may be identified in an event or an interrupt that is associated with the vault copy operation. The event or interrupt may indicate that the vault copy operation was performed successfully. Or alternatively, the event or interrupt may indicate that the vault copy operation has failed or was halted. If the vault copy operation was completed successfully, process 500 proceeds to step 522. Otherwise, if the vault copy operation failed or was halted, process 500 may proceed to step 518. Alternatively, in some implementations, the vault manager 222 may detect that the vault copy operation was halted or failed by examining one or more relevant error logs.

At step 517, vault manager 222 analyzes and/or identifies the cause of the event (detected at step 502). In one example, vault manager 222 may identify a component of a hardware component that has failed. Additionally or alternatively, vault manager 222 may identify a storage processor 102 that contains the failed hardware components. An identifier of the failed hardware component and/or an identifier of the storage processor 102 which contains the failed hardware component may be retrieved from a descriptor of the event and/or one or more error logs. In implementations in which the identifiers are retrieved from error logs, vault manager 222 may identify one or more entries in the logs that have a timestamp that is the same as (or within a predetermined distance from) the timestamp of the event, and retrieve the identifiers from those entries.

At step 518, vault manager 222 generates a service ticket based on the event (detected at step 502) and stores the generated ticket in the service ticket database 212. The service ticket may be generated based on information obtained at step 517. In some implementations, the ticket may be a string or object that includes or encodes one or more of (i) an identifier of a hardware component that has failed, which is obtained from the descriptor of the event or an error log, and/or (ii) an identifier of the storage processor 102 of which the component is part. In one example, when the event (detected at step 502) indicates a power supply failure, the generated service ticket may be for the replacement of power supply cables. When the event (detected at step 502) indicates AC power loss with both Matrix Interface Board Enclosures (MIBEs) killed, the service ticket may require the replacement of the MIBEs. When the event (detected at step 502) indicates Disk Array Enclosure (DAE) related issues, the service ticket may require a technician (or other personnel) to investigate and repair port or cable failures. When the event (detected at step 502) indicates a high or irregular temperature, the service ticket may require a technician (or other personnel) to take action to control the temperature. When the event (detected at step 502) indicates a battery discharge error, the service ticket may require a technician or other personnel to take action to maintain battery health. When the event (detected at step 502) indicates slow or offline fans, the service ticket may require a technician (or other personnel) to investigate and repair the fans. When the event indicates fabric or ethernet link issues, the service ticket may require a technician (or other personnel) to investigate or repair ports in the storage processor 102 that generated the event. When the event (detected at step 502) indicates missing or faulty cables, the service ticket may require a technician or other personnel to examine and replace any damaged cables in the storage processor 102 that generated the event.

At step 520, vault manager 222 notifies the user that a new service ticket is generated. The user in this example may be a system administrator or another person who is tasked with operating or otherwise monitoring the vault manager 222. In one example notifying the user may include displaying a visual element 322 in window 320, which corresponds to the service ticket (generated at step 520). Additionally or alternatively, notifying the user may include sending an email or a text message to a technician who is responsible or capable of addressing the service ticket. It will be understood that the present disclosure is not limited to any specific method for notifying the user.

At step 522, one or more system updates are updated. The logs and/or types of updates that are made may depend on the context of process 500. For example, when step 522 is executed after a branch from step 504, the event log 216 may be updated to include information about the event. As another example, when step 522 is executed after a branch from step 516, the event log 216 may be updated to include information about the event (detected at step 502), and the vault history log 214 may be updated to include an entry that corresponds to the vault copy operation (completed at step 516), which indicates that the vault copy operation has been completed successfully. As yet another example, when step 522 is executed after step 520, the event log 216 may be updated to include information about the event (detected at step 502), and the vault history log 214 may be updated to include an entry that corresponds to the vault copy operation (completed at step 516), which indicates that the vault copy operation was terminated or halted. The system logs and types of updates that are made may depend on the environment in which process 500 is executed. In this regard, it will be understood that the present disclosure is not limited to any specific type of system log being updated.

In addition, at step 522 an alert is generated if the vault copy operation could not be completed. For example, when step 522 is executed after a branch from step 504, an alert may be generated that indicates that the vault copy operation could not be started successfully. The alert may be transmitted to a system administrator and/or displayed on a display screen of the management system 141. As another example, when step 522 is executed immediately following the execution of step 522, an alert may be generated that signals that the vault copy operation has failed or was halted. The alert may be transmitted to a system administrator and/or displayed on a display screen of the management system 141.

Figure 6:
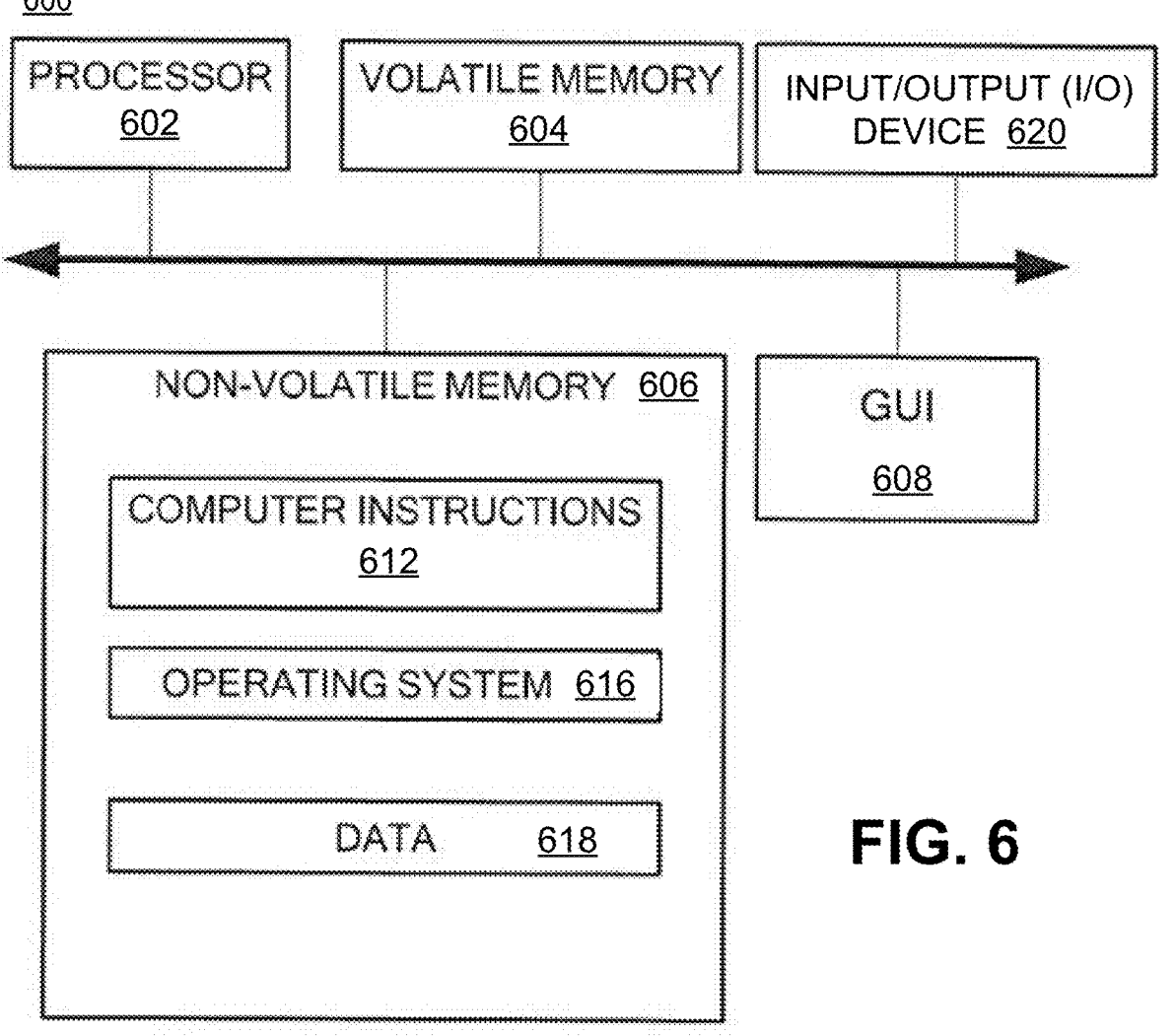
FIG. 6 is a diagram of an example of a computing device, according to aspects of the disclosure.

Referring to FIG. 6, in some embodiments, a computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604 to perform at least a portion of processes 400 and 500.

FIGS. 1A-6 are provided as an example only. At least some of the steps discussed with respect to FIGS. 1A-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:

detecting an event indicating a hardware malfunction in one of a plurality of storage processors in a storage system;

initiating a vault copy operation in response to the event, the vault copy operation being an operation in which a global memory of the storage system is copied to a non-volatile memory, the global memory including a plurality of portions that share a same address space, each portion being implemented by using physical memory hardware of a different one of the plurality of storage processors, wherein the vault copy operation includes executing a plurality of processes, each of the processes being executed on a different one of the plurality of storage processors, each of the processes being arranged to copy a portion of the physical memory hardware of the storage processor on which the process is executed to the non-volatile memory;

detecting whether the vault copy operation is completed successfully;

when the vault copy operation is not completed successfully, generating a service ticket for servicing a hardware component that is identified in the event as having malfunctioned, the service ticket being arranged to include or encode one or more of an identifier of the hardware component and an identifier of one of the plurality of storage processors of which the hardware component is part, the service ticket being arranged to trigger on-site maintenance by technical personnel, and when the vault copy operation is completed successfully, updating the one or more system logs without generating the service ticket.

2. The method of claim 1, wherein the vault copy operation is not completed successfully when the vault copy operation has failed or is halted.

3. The method of claim 1, further comprising:

starting a timer when the vault copy operation is initiated;

in response to the timer expiring, detecting whether the vault copy operation is still pending; and re-initiating the vault copy operation when the vault copy operation is not pending.

4. The method of claim 1, wherein the service ticket further includes an identifier of the storage processor of which the hardware component is part.

5. The method of claim 1, further comprising generating an alert when the vault copy operation is not completed successfully.

6. The method of claim 1, wherein updating the one or more system logs includes updating a vault history log.

7. A system, comprising:

a memory; and at least one processor that is operatively coupled to the memory, the at least one processor being configured to perform the operations of:

detecting an event indicating a hardware malfunction in one of a plurality of storage processors in a storage system;

initiating a vault copy operation in response to the event, the vault copy operation being an operation in which a global memory of the storage system is copied to a non-volatile memory, the global memory including a plurality of portions that share a same address space, each portion being implemented by using physical memory hardware of a different one of the plurality of storage processors, wherein the vault copy operation includes executing a plurality of processes, each of the processes being executed on a different one of the plurality of storage processors, each of the processes being arranged to copy a portion of the physical memory hardware of the storage processor on which the process is executed to the non-volatile memory;

detecting whether the vault copy operation is completed successfully;

when the vault copy operation is not completed successfully, generating a service ticket for servicing a hardware component that is identified in the event as having malfunctioned and storing the service ticket in a task maintenance database, the service ticket being arranged to include or encode one or more of an identifier of the hardware component and an identifier of one of the plurality of storage processors of which the hardware component is part, the service ticket being arranged to trigger on-site maintenance by technical personnel; and when the vault copy operation is completed successfully, updating the one or more system logs without generating the service ticket.

8. The system of claim 7, wherein the vault copy operation is not completed successfully when the vault copy operation has failed or is halted.

9. The system of claim 7, wherein the at least one processor is further configured to perform the operation of:

starting a timer when the vault copy operation is initiated;

in response to the timer expiring, detecting whether the vault copy operation is still pending; and re-initiating the vault copy operation when the vault copy operation is not pending.

10. The system of claim 7, wherein the service ticket further includes an identifier of the storage processor of which the hardware component is part.

11. The system of claim 7, wherein the at least one processor is further configured to perform the operation of generating an alert when the vault copy operation is not completed successfully.

12. The system of claim 7, wherein updating the one or more system logs includes updating a vault history log.

13. A non-transitory computer readable medium storing one or more processor-executable instructions, which, when executed by at least one processor, cause the at least one processor to perform the operations of:

detecting an event indicating a hardware malfunction in one of a plurality of storage processors in a storage system;

initiating a vault copy operation in response to the event, the vault copy operation being an operation in which a global memory of the storage system is copied to a non-volatile memory, the global memory including a plurality of portions that share a same address space, each portion being implemented by using physical memory hardware of a different one of the plurality of storage processors, wherein the vault copy operation includes executing a plurality of processes, each of the processes being executed on a different one of the plurality of storage processors, each of the processes being arranged to copy a portion of the physical memory hardware of the storage processor on which the process is executed to the non-volatile memory;

detecting whether the vault copy operation is completed successfully; and when the vault copy operation was not completed successfully, generating a service ticket for servicing a hardware component that is identified in the event as having malfunctioned and storing the service ticket in a task maintenance database, the service ticket being arranged to include or encode one or more of an identifier of the hardware component and an identifier of one of the plurality of storage processors of which the hardware component is part, the service ticket being arranged to trigger on-site maintenance by technical personnel; and when the vault copy operation is completed successfully, updating the one or more system logs without generating the service ticket.

14. The non-transitory computer readable medium of claim 13, wherein the vault copy operation is not completed successfully when the vault copy operation has failed or is halted.

15. The non-transitory computer readable medium of claim 13, wherein the one or more processor-executable instructions, when executed by the at least one processor, further cause the at least one processor to execute the operations of:

starting a timer when the vault copy operation is initiated;

in response to the timer expiring, detecting whether the vault copy operation is still pending; and re-initiating the vault copy operation when the vault copy operation is not pending.

16. The non-transitory computer readable medium of claim 13, wherein the service ticket further includes an identifier of the storage processor of which the hardware component is part.

17. The non-transitory computer readable medium of claim 13, wherein the one or more processor-executable instructions, when executed by the at least one processor, further cause the at least one processor to execute the operation of generating an alert when the vault copy operation is not completed successfully.

* * * * *